FIG. 1

INVENTORS
AL U. SHARON
MORTON SILVERBERG
JOHN M. BAILEY, JR.
ATTORNEYS

May 7, 1968  AL U. SHARON ET AL  3,382,487
DATAPHONE DRIVEN REMOTE DISPLAY SYSTEM
Filed Dec. 27, 1965  6 Sheets-Sheet 2

INVENTORS
AL U. SHARON
MORTON SILVERBERG
JOHN M. BAILEY, JR.
BY

ATTORNEYS

FIG. 4

INVENTORS
AL U. SHARON
MORTON SILVERBERG
JOHN M. BAILEY, JR.
BY

ATTORNEYS

United States Patent Office 3,382,487
Patented May 7, 1968

3,382,487
DATAPHONE DRIVEN REMOTE DISPLAY SYSTEM
Al U. Sharon, Penfield, Morton Silverberg, Pittsford, and John M. Bailey, Jr., Fairport, N.Y., assignors to Xerox Corporation, Rochester, N.Y., a corporation of New York
Filed Dec. 27, 1965, Ser. No. 516,608
10 Claims. (Cl. 340—172.5)

This invention relates generally to data display systems and more specifically to systems of this class capable of two-way communication with a remote digital computer.

In today's modern and complex society, computers have come to permeate more and more areas of our everyday life. Whereas the services of computers were once considered to be a luxury available only to huge technological complexes it is today commonplace to find these machines at work in virtually all phases of commerce, industry, and agriculture. Yet, while the use of computers has become accepted practice in even relatively small operations, the limited user nevertheless continues to be beset with problems of how to best secure the services he so urgently needs within the equally limited resources likely available to him.

It is in the foregoing context that the system presently to be described has its fullest application. For the central achievement of the present system is such as to place any and all remote users thereof into economical and refined two-way communication with a sophisticated centralized computer. More specifically, the communication in the present instance is established over ordinary telephone lines and via a standard dataphone, thus adapting the system to the needs of any user within reach of a telephone. The system is furthermore so designed that not only may the most complex alphanumeric data be transmitted, but so too may graphic displays including mathematical curves and line drawings be transmitted and displayed with equal ease.

It is thus an object of the present invention to provide a data display system capable of two-way communication with a remote computer.

It is furthermore an object of the present invention to provide a data display system capable of two-way communication with a remote digital computer via ordinary telephone lines and a conventional dataphone interface.

It is also an object of the present invention to provide a data display system in which graphic material of any variety whatsoever may be readily displayed, and at the direction of a remote central computer.

It is a further object of the present invention to provide a data display system in which numerous and varied alphanumeric character fonts may be rapidly interchanged at the direction of a remote central computer, and in which alphanumeric data thereafter created from such fonts may be displayed under control of both signals originating from manual operation of the system and/or signals originating at the central computer.

It is yet an additional object of the present invention to provide a data display system in which real time display of graphic materials is brought about at the direction of a remote digital computer, and wherein graphics appear in the customary form of a black on white display.

It is yet a further object of the present invention to provide a data display system including provision for visually presenting advance portions of the data being received or transmitted before the final form of the accumulated data is ready for display, whereby the operator of the system may by a "pre-look" verify the content and accuracy of data being transmitted or received.

In the present invention these and other objects are achieved by means of a dataphone-linked display system, including a cathode ray tube which is utilized—in conjunction with suitable optics—as a light writing source for a sensitized xerographic plate. This plate effectively retains the single real-time CRT image in the form of a latent electrostatic image. Upon completion of the composed message or graphical display the latent electrostatic image is automatically developed and projected onto a display screen.

The system includes electronic circuitry suitable for composing both alphanumeric information and graphic information. After initiation of the communications link by the system operator, the central computer loads the decoder-storage portion of the present system with an appropriate encoded character library. The character library is in effect loaded into a specially organized delay line and thereafter continues to cyclically recirculate within this line. Subsequently—at the direct instance of the system operator or via the indirect control exercised by the computer in response to inquiry—successive bits may be gated out from the recirculating delay line to serially blank or unblank the cathode ray tube spot as the spot sweeps a predetermined pattern. The resulting alphanumeric pattern is imaged on the sensitized xerographic plate, and after development, presented to the viewer as a bright black on white display.

In another mode of operation of the present system the remote central computer may directly communicate with a portion of the system hereinafter designated as the vector-plotter. The circuitry in this mode of operation is such as to result in production at the CRT face of a vectored point of light which traces the curve digitally directed by the computer. As in the previous—or so called "write mode" the light spot itself traces its real time path upon the sensitized xerographic plate, the resulting latent image being thereafter developed and rendered visible to the viewer as a projected bright display.

A more complete understanding of the present invention, of its numerous advantages, and of the manner in which the invention acts to attain the several objects previously recited and other objects not explicitly indicated, may now best be gained by a reading of the following detailed specification together with an examination of the drawings appended hereto in which:

In the description that follows, certain parameters will frequently be assigned to data being manipulated by the display system. Thus, for example, a word may be referred to as comprising a specific number of bits, or a portion of a delay line may be described as having a given specific number of bits reserved for a given purpose, and so forth. In all instances such as these, it is to be understood that the parameters cited are intended merely to concretely illustrate operation of the system and are not in any way intended to delimit the invention otherwise described.

Figure 1:
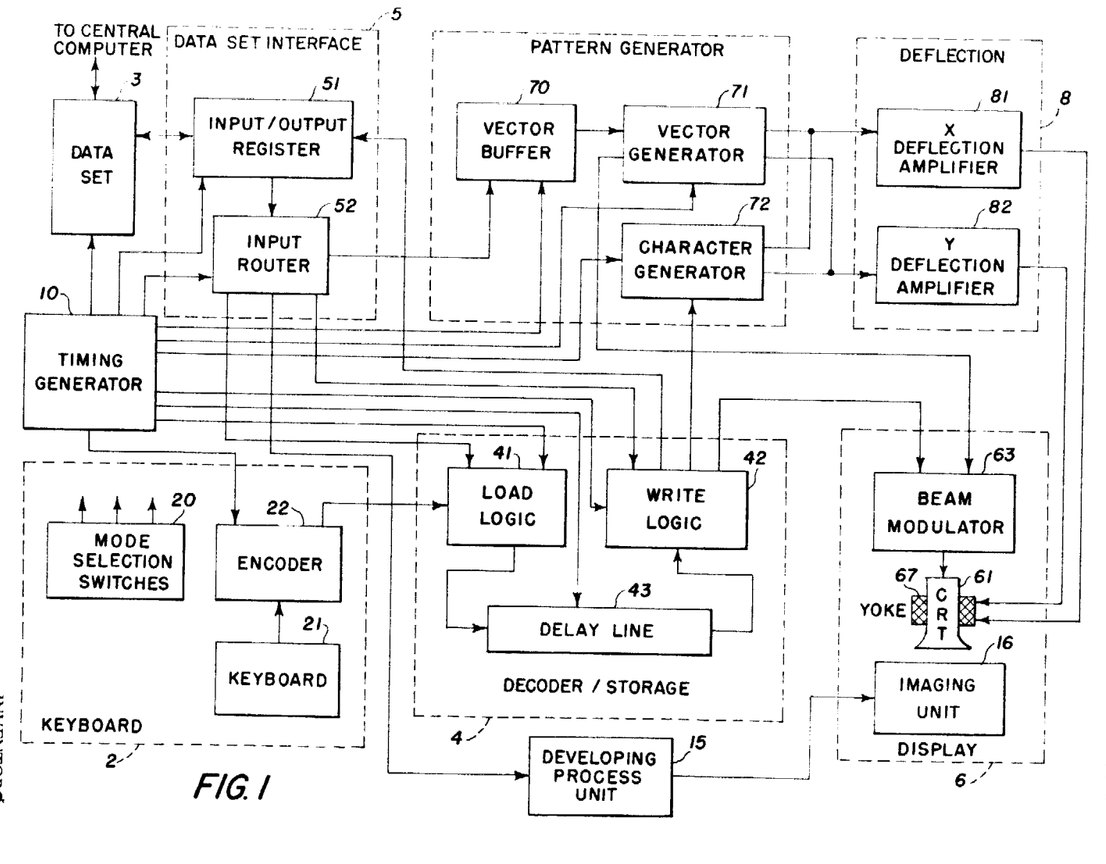
FIGURE 1 is an electronics block diagram for the overall remote display system.

In the electronics block diagram depicted in FIGURE 1, a conventional timing generator at 10 supplies proper timing pulses to all digital sub-systems. Digitally encoded data is fed to and from a control computer via the standard data set 3. The latter instrument is a commercially available item commonly employed—as in the present application—as a terminal interface in the transmission of binary encoded data. Essentially the instrument performs as a buffer amplifier, and accomplishes isolation, power amplification, and impedance matching. A suitable instrument of this type is, for example, available from the Bell System under the designation "Model 201A Data Set." For purposes of the present discussion it may be assumed that the data input rate through the data set is 2,000 bits per second NRZ (non-return to zero). This is a figure fully compatible with the capabilities of the usual telephone transmission lines.

*Modes of operation*

A keyboard generally designated at 2 includes a battery of mode selection switches at 20. Generally speaking, at the option of the operator five modes of operation may be set for the present system.

In the mode hereinafter designated as "load" the computer loads the decoder-storage portion 4 of the present system with an appropriate encoded character library. In the usual course of the system operation this mode would be entered after every console power shutdown, or whenever the operator specifically initiates a load request to the computer. Upon completion of this load process—which with a set of parameters typical for the present system will take approximately 4.5 seconds—this mode is terminated automatically.

In a second mode, hereinafter designated as "write," computer data in the form of both alphanumerics and line graphics, is projected onto a sensitized xerographic plate by a non-recurring trace formed on the face of CRT 61. Upon completion of the message (as signalled by the computer) the "display" mode is initiated automatically.

In the "display" mode the latent electrostatic image on the xerographic plate is developed to produce a visible image for projection on a display screen. The display remains upon the screen until another message is requested from the computer.

In a fourth mode of operation—hereinafter designated as "pre-look-computer"—a single line of computer-generated information is displayed in real time on a section of the CRT which does not project this information onto the xerographic plate. Instead the information is presented directly to the operator. This incoming information can also be stored for subsequent projection onto the xerographic plate.

In a fifth mode of operation—hereinafter designated as "pre - look-keyboard"—alphanumeric information from the keyboard 21 may be displayed on the non-recording section of the CRT in the same manner that pre-look-computer information is displayed. At the operator's discretion this data may also be projected onto the xerographic plate and forwarded to the data set 3 for transmission to the central computer.

*Data set interface*

The data set interface section of the present system is generally indicated in FIGURE 1 by the numeral 5. This portion of the present system consists principally of input-output registers as at 51, and the input route 52. In addition, conventional timing circuits, including a stable oscillator, electronic counters, and associated logic, are present within the interface section of the system. These latter elements are not explicitly indicated in view of the fact that the use of such clocking techniques to the data in and out of the registers is a technique commonplace and well understood by those skilled in the art of digital data manipulation. In a general sense, synchronization between the display system and the data set is achieved in the present instance either by slaving the data set timing to the display system timing generator or vice- versa, it being understood that the precise manner in which this brought about will vary somewhat depending upon the precise data set actually utilized in conjunction with the display system.

Encoded characters are generated within the keyboard section 2 of the present system by manual activation of the keyboard 21. From the encoder 22 these characters are transferred through the load logic at 41 into the delay line 43 where they are stored in a portion of the line reserved for such purposes. This portion of the line is identified at 55 in FIG. 2 as a "pre-look" segment—for reasons to be subsequently identified. The write logic 42 gates this inquiry data to the input-output register 51, thence to the data set 3, and ultimately to the central computer. The computer will respond when ready with the requested data to the display system.

For purposes of illustrating the system operation this computer furnished data may be considered as generally made up of successive 10-bit words although in particular instances all of such bits need not be necessarily used in a functional sense. Thus in some typical instances 7 bits will represent a character, 1 bit will be for parity purposes, and 2 bits will be surplusage. In an illustrative case the requested data is preceded by a 10-bit routing word. This first word is decoded by the input router 52 and indicates by its code whether the succeeding data should be routed to the load logic 41, to the write logic 42, to the developing process unit 15, or directly through the vector buffer 70 and thence to the vector generator at 71. The input router 52 also generates the required mode signals to enable the appropriate display system function.

*Decoder/storage*

The decoding action of the elements contained within decoder/storage section 4 is such as to convert a relatively low bit encoded character into a serial stream of considerably more numerous bits, which are then used to blank or unblank the electron beam of CRT 61 as it scans a prescribed path. Typically, a seven-bit encoded character is so converted into a serial stream of 84 bits. Essentially, the decoder consists of a recirculating delay line 43 which may, for purposes of illustration, be considered as a five millisecond magneto-strictive delay line capable of storing 10,000 NRZ bits at a clock rate of 2 mc./s. Timing circuits in the input of this delay line gate the incoming encoded data into the delay line in proper time sequence.

Figures 2, 3, 7C:
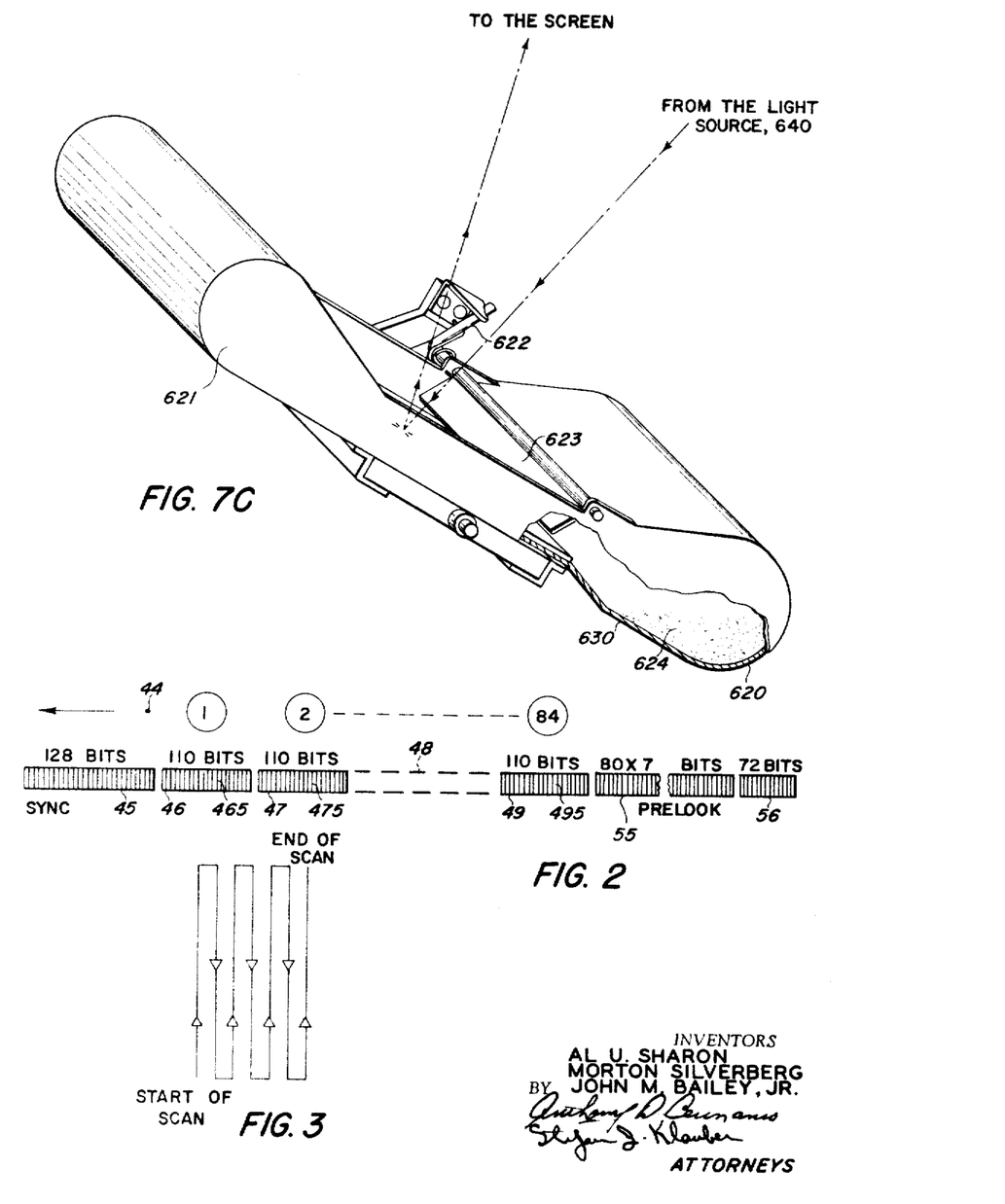
FIGURE 2 is a diagrammatic illustration of the delay line organization.
FIGURE 3 diagrammatically illustrates the scan pattern utilized in the character generator subsystem.
FIGURES 7a, 7b, and 7c are detailed diagrammatic illustrations of the development cassette.

A graphical depiction of the organization of the loaded delay line 43 is shown in FIGURE 2. In order to fully appreciate the operation of the decoder, one may assume an arbitrary cyclic recirculation of the data in the delay line in a direction corresponding to the arrow in FIGURE 2. This is to say that one may consider the various signals propagating in the delay line to consecutively and cyclically pass a given fixed point external to the delay line, such as point 44. The delay line is organized with an initial section such as 45, illustratively shown as containing 128 bits, which acts as a synchronization (sync) word to indicate the reference point after which the encoding data will start. During the loading mode the sync bits contained in section 45 are loaded into the delay line in the same manner as the encoding data.

Following this sync segment, a series of successive segments, such as 46, are loaded into the delay line. Consistent with the examples thus far cited, we may consider specifically that 84 such successive segments are loaded into the line. Thus in FIGURE 2, the second such segment is identified as 47, intermediate (but unshown) segments are indicated by the dotted lines at 48, and the final—or 84th segment—is conveniently identified as 49. Each of the successive segments 46, 47 and so forth is broken up into as many bits as corresponds to the number of characters used in a character set. In FIGURE 2, for example, it may be illustratively assumed that each of the segments 46, 47 and so forth, is broken up into 110 such bits. The order in which these bits are located within each particular segment corresponds to the code which represents the character. For example, the 65th bit in the segment 46, which is identified in FIGURE 2 by the numeral 465, will be the first bit required to display the character A if ASCII code is used. (The latter reference is to the American Standard Code for Interchange of Information recommended by the IEEE.) Similarly, the 65th bit in segment 47, which is therein identified by the numeral 475, will be the second bit required to display the character A, and so forth, until finally the 84th segment of 110 bits is reached wherein again the 65th bit, identified in FIGURE 2 by the numeral 495, represents the 84th bit required to display the same character.

The remaining organization of the delay line will be discussed at a later point, but the manner in which the organized delay line is utilized to achieve character generation should now be evident. More particularly, computer words entering the display system in the write mode and routed to the decoder-storage portion 4 thereof, are compared to the state of the counter within the write logic 42, which keeps a count of the data bits in the delay line following the sync segment 45. Whenever a match exists—which will occur once in every segment—the bit is gated out of the delay line and is held while blanking or unblanking the CRT 61 beam depending upon its binary value. If the scan time of a fixed pattern on CRT 61 is then made identical with the time required for all 84 segments (45, 46, etc.) to pass a fixed point in the delay line, it follows that exactly 1/84 of the scan time after an initial bit is gated out, the following bit value of the same character will be detected, gated out, and will thereupon replace the previous bit in modulating the CRT electron beam. This scheme of encoding thus allows serial character decoding with only one bit stored external to the delay line, and if as previously suggested, a full delay line recirculation period occupies 5 ms., it follows that the recirculation period will exactly match the period of one ten bit input word (7 bits therein representing the character) for the indicated input rate of 2000 bits per second. Therefore once during every word period of 5 milliseconds every bit in the delay line will be exposed to comparison with the input code and all 84 bits comprising the particular character will be gated out during this period.

*Character generator subsystem*

The write logic 42 in addition to providing appropriate data manipulation signals in response to data transferred from the data set interface 5 into the decoder storage, section 4, also generates the required scan start-stop signals for the character generator 72. The latter, it will be noted in FIG. 1, is functionally contained within the pattern generator block generally designated at 7. As, however, the character and vector beam motions respectively are generated by two basically different techniques, it is desirable to consider the character generator 72 as a distinct entity from the vector generator 71 and the vector buffer 70. For this and other reasons it is convenient to regard that portion of the present display system including the data set 3, the data set interface 5, the keyboard section 2, the decoder-storage section 4, the character generator 72, the deflection section 8 and the display section 6 as constituting in effect a self-contained character generator subsystem.

Characters and symbols are generated on the face of CRT 61 by modulation of the electron beam as it is deflected, under control of character generator 72, through a fixed line pattern. This pattern, illustratively shown in FIG. 3 is repeated for each character or symbol. The total scan time—as has been previously discussed—is arranged to be slightly less than the circulation period of the delay line 43, so that the scanning beam can be appropriately blanked by the serial bit data stream from the decoder-storage section 43. With the parameters as previously indicated the 84 bits—which are evenly spaced in time through the scan period—switch the beam on or off in accordance with their binary value. For example a binary "one" would generate a visible stroke for a period which approximately equals 1/84 of the character scan time.

In the overall display system the initial position of the first character on the display is controlled by computer commands through the use of the initial beam positioning circuits which will be more fully described in connection with the description of the vector plotter portion of the system. Upon the completion of one character, the character generator circuitry skips the electron beam to the scan-start position of the following character. This introduces a spacing which can in a typical case be set to be approximately one-quarter width between characters. When the skipping of one or two spaces is desired the central computer is programmed to send the display system a character code which has been previously encoded and entered into the delay line as a complete blank. That is to say, the CRT beam is blanked throughout the scan period. Skipping of more than two spaces, skipping lines, or changing the beam location unrelated to the normal character or line positions is accomplished by repositioning the beam as in the establishment of the initial character position. In a typical format 80 character spaces appear in a displayed line and after all 80 characters are displayed the generator indexes the beam down one line position thereby providing one character height spacing between adjacent lines.

It will be readily appreciated by those skilled in the art that the character generating capabilities of the present system are in no way limited to the remote display type of unit being particularly considered herein. This is to say that the character generation technique described is, on the contrary, a generalized scheme that may be readily seen to have the widest applications. That technique is seen to include the concept of organizing a delay line into successive, and in turn sub-organized, segments. Thereafter character generation is achieved by serially gating out successive corresponding bits in the successive segments, as such segments cyclically circulate in a closed loop.

It is of particular importance here to realize that the makeup of the delay line—that is to say its organization—may be completely changed in an extremely short period. Considering for example the presently described device, it is evident that the "organization" of the delay line— which in effect means the character font loaded into the line—may be completely changed in the order of four and one-half seconds. And the only reason that the change-over time is even as long as this is because of the limitations imposed by the telephone transmission lines bearing loading data from the central computer. That is to say that we are assuming an input limitation of some 2000 bits per second. In a more general case (where loading data is available "locally") the loading of the delay line will be time limited only by the recirculation period of the line itself. Thus we could be describing a complete change of the character font therein contained within a time period of the order of milliseconds.

It will of course be further evident that character fonts of any description whatsoever could be loaded into the delay line. Thus, for example, one might in the reloading period wish to change from the Latin alphabet to the Cyrillic alphabet, or to Arabic characters or so forth. Similarly the line could be reloaded with mathematical symbols, designations and so forth.

Referring once again to FIGURE 2 illustrating the organization of the delay line 43, it will be noted that a segment is indicated at 55 for allocation to a prelook function. Typically this segment will be subdivided into 80 7-bit characters—that is to say a sufficient number of characters to display at least an entire line. While the display system is in one of the two prelook modes of operation, these digitally encoded characters are entered serially into the delay line in the exact sequence in which they arrive from the central computer or from the keyboard section 2 of the system. Whereas—as previously indicated—the delay line has a characteristic recirculation period of 5 ms., the stored characters are read out sequentially, one every 5 ms., and are decoded in the same manner as incoming central computer data would be decoded in the write mode. Since the data being displayed in the prelook mode, however, is intended for direct visual observation, the line of characters is held within the prelook segment 55 of the delay line, and continues to recirculate in the delay line cycle during the visual observation period, thereby cyclically regenerating the displayed line at the rate of some 2½ times per second where the parameters are as previously specified.

As will be discussed in greater detail in connection with the description of the display section 6, the data displayed during a prelook mode of operation is actually imaged on a portion of the CRT face such that actual writing on the sensitized xerographic plate 62 utilized in the display system does not occur. At operator option, however, this data may subsequently be transferred to the recording portion of the CRT for exposure onto the xerographic plate 62 contained within the imaging unit 16.

At 56 a final segment—illustratively shown as containing 72 bits—is provided. This segment is not utilized operationally but is rather reserved for expansion of the prelook segment 55.

*Line graphic (vector) plotter*

In the present system vector plotting is initiated upon the detection of an appropriately encoded word by the input router 52. Data thereafter follows the path from the input router 52 through the vector buffer stage 70, the controlling vector generator 71 and the deflection circuitry generally designated at 8. The latter, in turn, effects the line display formed at display section 6.

Figure 4:
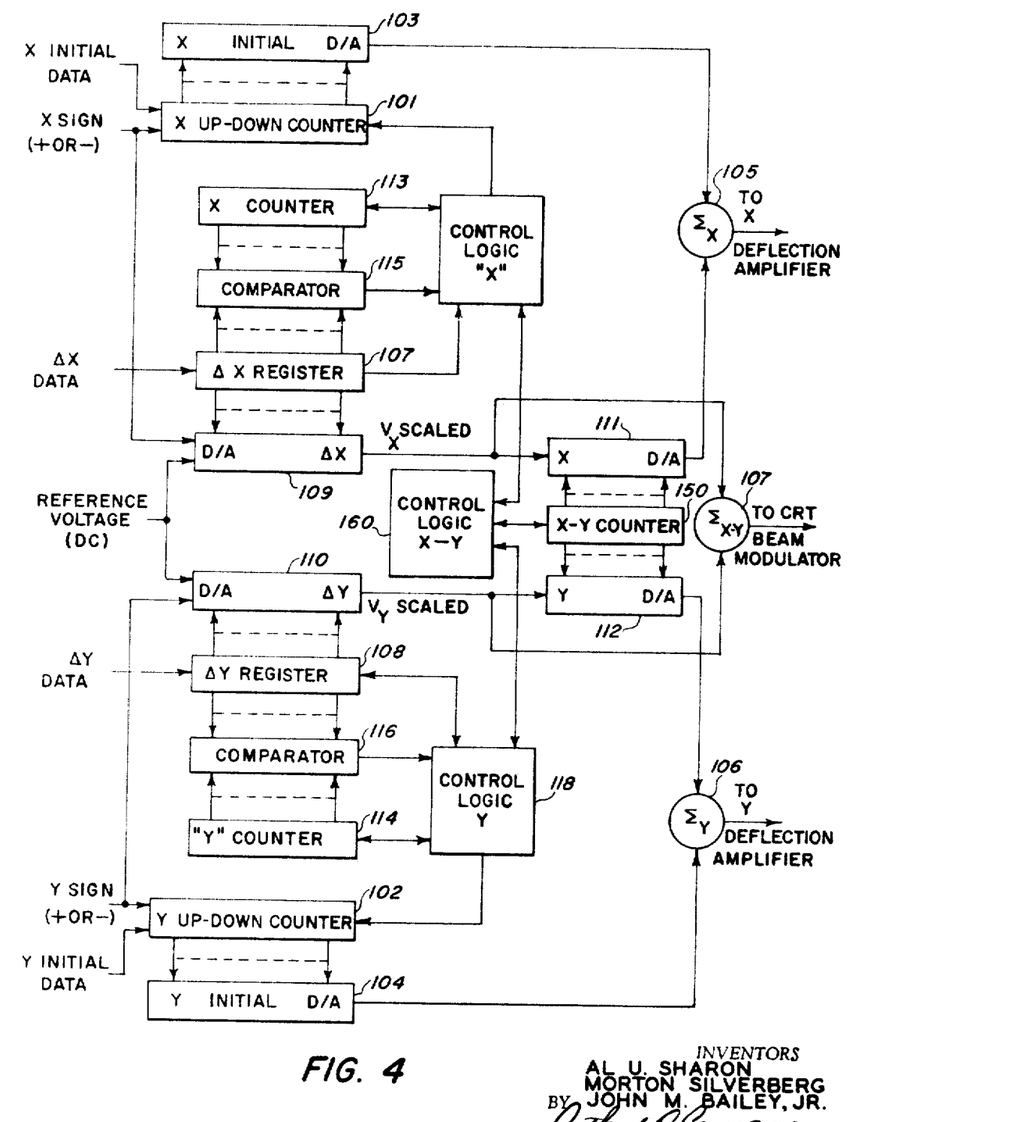
FIGURE 4 illustrates in detailed block form the elements and mode of operation of the vector-plotter portion of the present system.

The operation of the vector generator 71 is shown in much greater detail in the block diagram of FIGURE 4. Assuming then that the vector plotting mode of operation has been initiated, it may be assumed that two words are initially entered—indicated in FIGURE 4 as "X initial data" and "Y initial data"—which represent the initial beam position with respect to a reference point on the CRT 61 face. During this initial positioning the CRT beam remains blanked with no trace drawn upon the CRT face. Subsequent words transmitted from the computer will represent the binary value of an increment $\Delta X$ or $\Delta Y$ by which the beam must be deflected in each direction to reach a new position $(x+\Delta x;\ y+\Delta y)$. Since the beam motion is effected by both the $\Delta X$ and $\Delta Y$ quantities, it resolves a line which is the vectorial representation of the two quantities.

Initial positioning data is entered into either the X or Y up-down counter indicated respectively at 101 and 102. The contents of each up-down counter undergoes digital to analog conversion in parallel at 103 and 104 respectively, and is thereafter fed through the X or Y summing networks at 105 or 106 to the appropriate X or Y deflection amplifier. When a quantity $\Delta X$ or $\Delta Y$ arrives from the computer with the appropriate positive or negative sign, it is entered into the $\Delta X$ or $\Delta Y$ registers at 107 and 108 respectively. The contents of these registers are thereafter digital to analog converted in parallel at 109 and 110.

The outputs of the D/A (digital to analog) converters at 109 and 110 are thereafter used as variable reference voltages for a second set of digital to analog converters denoted in FIGURE 4 as "X D/A" and "Y D/A" at 111 and 112, respectively. This latter set of D/A converters are connected in parallel to an 8-bit X-Y counter 150. The X-Y counter 150 is initiated after both $\Delta X$ and $\Delta Y$ words have been entered into the $\Delta X$ and $\Delta Y$ registers at 107 and 108, respectively. The outputs of the X and Y D/A converters at 111 and 112 are thus increased by one increment for every count of the X-Y counter 150. Since, however, the reference voltage used by these D to A converters is scaled by $\Delta X$ or $\Delta Y$, the change in voltage for every incremental change in X or Y will be directly proportional to the magnitude of the received $\Delta X$ or $\Delta Y$. The outputs of converters 111 and 112 are then summed with the appropriate X-initial or Y-initial digital to analog converter outputs originating at converters 103 and 104, throughout the period of beam writing.

After completion of the 255th count of the 8 bit X-Y counter 150, the beam is blanked and the X counter and Y counter at 113 and 114 respectively are activated. The X up-down counter at 101 or Y up-down counter at 102 count in accordance with the X or Y sign ($\pm$), for as long as the respective X or Y counters at 113 and 114 are counting. The status of each of the X and Y counters is continuously compared by bit comparators at 115 and 116 to the respective $\Delta X$ or $\Delta Y$ registers at 107 or 108. When comparison is detected (independently for X and Y), the counting of the associated X or Y counter and up-down counter is stopped and the $\Delta X$ (or $\Delta Y$) register and X (or Y) counters are cleared. At this point in time the contents of the $\Delta X$ and $\Delta Y$ registers have been added to or subtracted from the contents of the X-initial and Y-initial positions maintained by the X and Y up-down counters at 101 and 102. The beam can now be moved by a new $\Delta X$ and/or $\Delta Y$ quantity or remain unmoved for an unlimited time without loss of positioning accuracy since its position is held in a digital form. All logic functions for the operations described are—as shown in FIGURE 4—performed within control logic at 117 for X, at 118 for Y, or in the case of counter 150, within the X-Y control logic at 169. The latter also is seen to coordinate the former two in the interacting operations that have been described.

While the vector plotter implementation has been particularly described for a situation wherein the X-Y counter at 150 is organized on an 8-bit basis, it will be apparent to those skilled in the art that in a more general form the counter 150 could be organized on any $n$-bit basis. In such a generalized case the output of the D/A converters at 111 and 112 would be increased in $2^{n-1}$ increments. Since the $\Delta X$ and $\Delta Y$ quantities are thus incremented by the same number of pulses in each $1/2^{n-1}$ part of the CRT trace period, successive small increments of the desired line are drawn by the beam. And each such segment of the displayed line retains the exact slope of the line since it contains exactly $1/2^{n-1}$ of $\Delta X$ and $\Delta Y$ quantities. The displayed line will therefore appear continuous and unbroken.

In the configuration described thus far the CRT beam rate of displacement depends upon the length of the vector traced; that is to say the longer the vector, the faster the beam must be moved. Since the beam, however, must be bright enough to be visible or recordable at maximum speed (for maximum $\Delta X$ and $\Delta Y$ values), it follows that when a low value $\Delta X$ and $\Delta Y$ line—that is to say a short line—is drawn, the beam speed will be low and the brightness of the trace on the display will be unduly high as beam speed and beam brightness are inversely related. To prevent such a large change in display brightness intensity, the voltages from the converters 109 and 110—which are designated in FIGURE 4 as "$V_x$ scaled" and "$V_y$ scaled" are added by a summing network at 170. The output of this network is used—as indicated in the figure—to modulate the CRT beam, whereby the beam intensity will be directly related to the magnitude of the quantity $(\Delta X+\Delta Y)$. The increased beam intensity for high values of $(\Delta X+\Delta Y)$ will therefore compensate for the tendency of decreased trace brightness for high values of $\Delta X$ and $\Delta Y$. It may be noted in this respect that the length of the line which has $\Delta X$ and $\Delta Y$ as its components is $[(\Delta X)^2+(\Delta Y)^2]^{1/2}$, a result which is different from the beam modulation factor of $(\Delta X + \Delta Y)$. However, the ratio $$\frac{\Delta X + \Delta Y}{[(\Delta X)^2 + (\Delta Y)^2]^{1/2}}$$

varies between 1 and $\sqrt{2}$ only, and can be easily tolerated.

*Image display*

Figure 5:
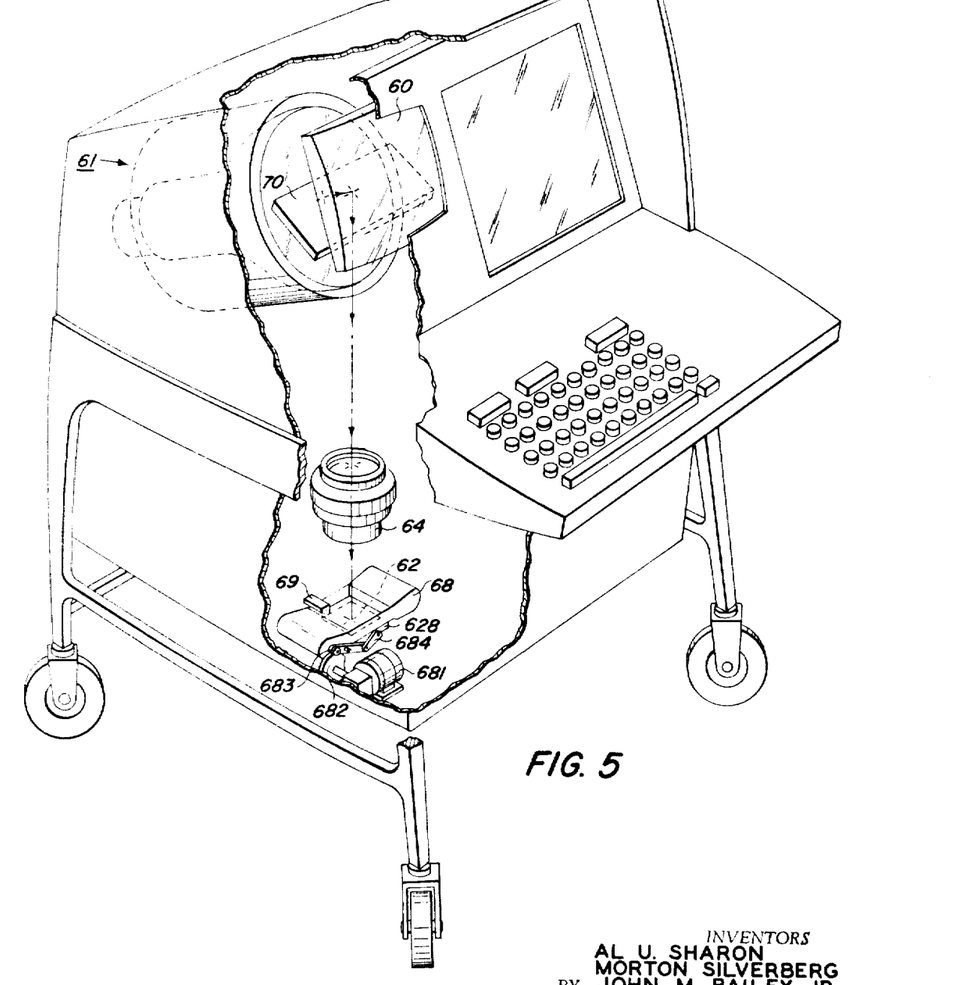
FIGURE 5 is a pictorial partially sectional view of the imaging optics of the present system.
Figure 6:
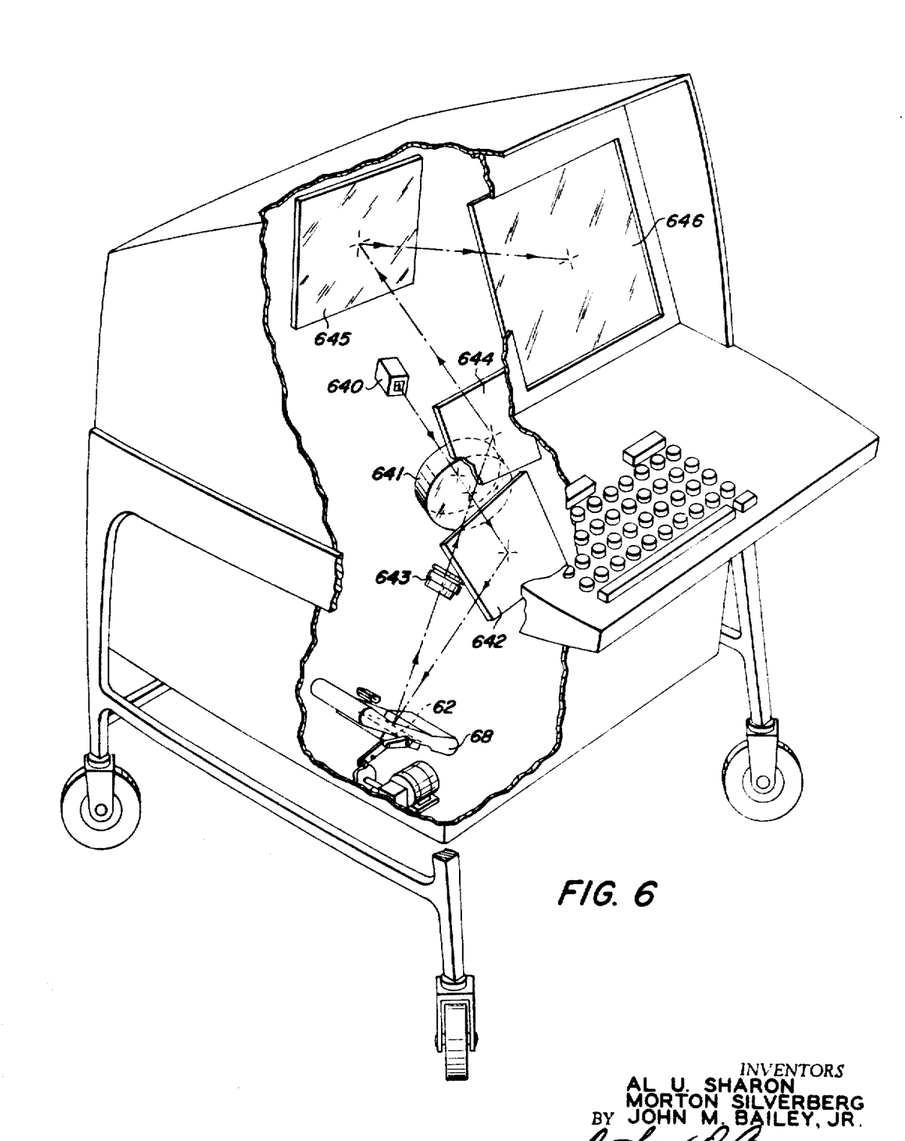
FIGURE 6 is a pictorial partially sectional view of the projection optics of the present system.
Figure 7A:
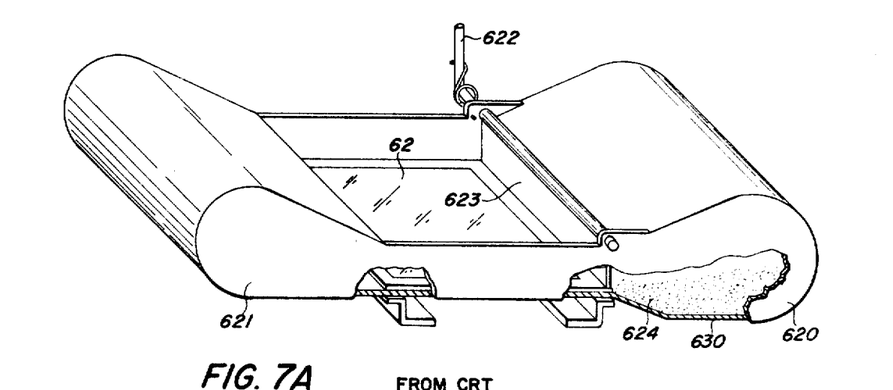

The display section of the present system has been referred to continuously throughout the foregoing description. Generally speaking, this portion of the system is designated in FIGURE 1 at 6 and includes the cathode ray tube 61, beam modulator means generally designated at 63, and the imaging unit at 16. The latter indicates the various optical components, the photoreceptor, light source, developing means, etc., all of which will be fully elucidated in what follows. A pictorial representation of the arrangement of the several parts with respect to the overall device is shown in FIGURES 5 and 6. The former shows the orientation of the several components during the imaging cycle (also in the prelook mode), and the latter indicates the orientation of the components during the projection step. FIGURE 7 will be found to illustrate in considerable detail the development cassette 68 incorporating the xerographic plate which has been previously referred to in this specification.

Referring to FIGURE 5, the cathode ray tube utilized in the present system appears generally at 61. In a typical instance, the CRT is a 9" diameter flat faced unit, utilizing a P7 phosphor, low angle magnetic deflection and electrostatic focus. With a diameter tube as indicated the useful area on the CRT may suitably comprise a 5.35 inch by 5.35 inch square in the sense that this square area will be used for projection of the stored image onto the xerographic plate 64 for later viewing by the operator. With the same parameters a small .3 inch high by 5.35 inch wide area located above the square is used for pre-look modes of operation.

The P–7 phosphor previously alluded to is a designation for a particular phosphor type, the identification "P–7" being made in accord with the standards of the Electronic Industries Association. The phosphor selection is based on the performance of two display functions. First it will be recalled that in the pre-look mode data stored at segment 55 of the delay line is—with a typical set of parameters—presented at a 2.5 cycle (frames) per second rate. Accordingly, a long persistance phosphor is necessary to minimize undesirable flicker. Secondly, the CRT must be used in the write mode as the source for full frame exposure of the data to be stored on the xerographic plate. As the plate will commonly have for its light sensitive element a photoconductive layer of selenium, the plate will have its maximum sensitivity in the blue light region of spectrum. Hence, the CRT image should desirably be rich in blue light. Both of the aforementioned requirements can be satisfied by the use of the P–7 phosphor which has two major spectral peaks—one in the yellow region of the spectrum and one in the blue region.

The yellow component has a decay time of approximately one second to the 10% amplitude point, and the blue a decay time of approximately 50 micro seconds to 10% amplitude. Because of this difference in decay times for the two peaks, it may in fact be desirable in the present system to utilize a yellow filter in the segment of the display used for direct viewing to eliminate flicker due to the blue flash in the aforementioned 2.5 cycle per second frame rate. Similarly, it may be desirable to place a blue filter in the optical path between the CRT face and the photoconductor in order to eliminated the long persistance yellow component. The use of yellow and blue filters as mentioned may be desirable too, in that their insertion into the optical path specified assists in blocking room light from the xerographic plate.

The CRT beam modulator at 63 (FIG. 1) receives binary and analog signals through the two separate inputs identified at 65 and 66. The binary information which comes via the write logic 42 of the decoder storage section 4 of the system operates through a saturating video switch (not shown) to blank or unblank the CRT beam. This mode of operation has largely been described in connection with the foregoing description of the decoder storage portion of the system. The analog, signal, on the otherhand, which originates at the vector plotter portion of the system, operates (as has been previously discussed) to modulate the intensity of the beam through a standard video amplifier contained within 63.

The deflection amplifiers 81 and 82 are desirably direct-coupled feed-back amplifiers. They provide a low impedance drive to the deflection yoke 67 for the accurate positioning of the electron beam. The deflection yoke 67 used in conjunction with the CRT is a standard unit and typically is a single ended unit of flat field characteristics exhibiting a spot recovery time of the order of four microseconds.

A principal feature of the present system is the image storage means represented by the xerographic plate 62, together with the associated optics, generally designated in FIGURE 5 at 64. These image storage means are such as to allow information displayed on the CRT to be written in real time on the xerographic plate and thereafter retained indefinitely, or until the operator initiates further display. It is significant to appreciate that because of the image display technique utilized no further regeneration or action by the electronic sub-system is required during the image display period. And yet when the operator desires, the system can be prepared for reimaging from the CRT in a time period less than 2 seconds.

Referring again to the pictorial representation of FIGURE 5, the display portion of the system is seen to include the CRT generally designated at 61, the lens system 64 and the xerographic plate at 62 which is a portion of the more generalized development cassette at 68. The cassette 68 is in turn frictionally held in a rockably mounted frame 628. Further details of this cassette and frame will be discussed in connection with FIGURE 7. Corona charging means are provided at 69 to sensitize the plate 62. The charging means are positioned so as to not interfere with the light spot traversing the sensitized plate during the write mode.

The operator views the CRT face through a virtual image viewer 60. During pre-look modes of operation the pre-look area of the CRT face may in this manner be viewed directly. In addition, while the image produced on xerographic plate 62 during the write mode is intended primarily for stored viewing it will be evident that a transient—yet in relative terms persistant image will appear at the CRT face even during this mode and may be of at least passing interest to the operator. Accordingly the dichroic mirror 70 is positioned to permit the viewer to follow the progress of the beam during the write mode. More specifically, the dichroic mirror 70 will reflect the blue light component of the CRT trace to xerographic plate 62 while simultaneously transmitting the yellow light component to the viewer.

The display portion of the present system utilizes a xerographic process called PROXI (projection by reflection optics of xerographic images). The general principles of PROXI display have been described in numerous places, including the patent application of Harold E. Clark and George R. Mott bearing Ser. No. 343,183, filed Feb. 3, 1964, entitled, "Image Projection" and assigned to the same assignee as the present application. A similar system has also been described on page 382 f.f. of "Xerography and Related Processes," edited by John H. Dessauer and Harold E. Clark (The Focal Press, London and New York, 1965). Briefly, this system operates in the following manner: A photoconductive surface (xerographic plate 62) is charged and exposed to produce a latent electrostatic image. Where the light strikes the charged photoconductive surface the conductivity is varied locally depending on the exposure provided by incident radiation. This variation of conductivity selectively discharges the photoconductive surface to produce a latent electrostatic image which is a replica of the incident radiation pattern. A developer which consists of triboelectrically charged toner particles and carrier beads is cascaded over the xerographic plate and the toner adheres to the latent electrostatic image thereby producing a physical image.

In the generalized PROXI system the developed toner image is projected optically onto the display screen. In achieving projection advantage is taken of the fact that areas of the developed image in which the toner has adhered scatter or absorb light, while toner-free areas reflect light specularly—that is in a well-defined direction. The developed image area is therefore illuminated with well columnated light at an oblique angle of incidence, and optics are positioned to collect light at an equal angle of reflection. For those areas which are void of toner particles the amount of light collected is a function of the collimation of the illuminating beam and the aperture of the collecting optics. For areas which contain toner, however, and hence produce diffuse reflection, the amount of light collected is a function of the aperture of the collecting optics only. The relative light intensity from clear and toned areas (contrast ratio) is then solely a function of the optical design.

Figure 7B:
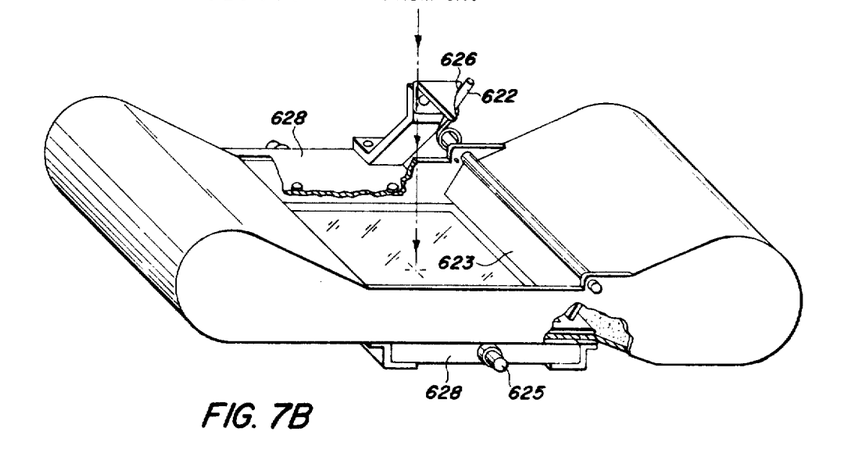

In the image display portion of the present system a cassette type PROXI image forming sub-system is utilized. The cassette system is generally shown at 68 in FIGURE 5, and in much greater detail in FIGURE 7. The latter figure—in part (A) thereof—shows the cassette to comprise a closed device that is essentially a complete, yet miniaturized, xerographic development system. The developer 624, which in the present instance desirably comprises a clear light scattering (and hence low infra-red absorbing) toner and carrier beads, is retained in small troughs 620 and 621 at either side of the selenium-surfaced xerographic plates 62. The trough 620 is seen to be somewhat larger in volume than 621, and it will be noted that its bottom portion 630 extends somewhat below the plane of plate 62. As shown in FIG. 7B, a cam at 626 is secured to the cassette frame 628 and engages the bar 622 of spring actuated closure 623 whenever the cassette 68 is within the frame 628. The closure 623 is thus in an open position whenever the cassette is mounted in the display system, but closes on such occasions as the cassette is removed—e.g., for refilling, service, etc.—in order to avoid spillage or contamination.

As is shown in FIGS. 5, 6 and 7, the cassette frame 628 is mounted about a transverse axis 625 so that it may undergo oscillation to the extent of approximatey ±30 degrees about such axis. Motor driven oscillating means are provided at 681 (FIG. 5) which act through cam 682, roller 683, and linkage 684 to controllably oscillate frame 628 in response to signals emanating from developing process unit 15 (FIG. 1). The latter in turn may be seen to be activated by digital commands routed to it from input router 52. During the imaging process the cassette as shown in FIGURE 5 and in FIGURE 7(B) remains in an essentially horizontal position with the developer gravitationally retained in the deeper trough 620. As previously indicated the portion 630 thereof is sufficiently depressed to assure that toner will not spill over onto the plate 62 during imaging. Upon completion of the imaging process, the cassette is oscillated about this axis so that developer 624 particles from the end storage troughs 620 and 621 cascade over the latent electrostatic image and thereby produce a physical light scattering toner image.

When the development cycle is complete the cassette is stopped in the projection position—that is at approximately 30 degrees from its normal horizontal position, and with the deep trough 620 depressed. Projection then takes place as is shown in the pictorial representation of FIGURE 6 and also in the detailed showing of FIG. 7(C). Here we see the light source 640 passing through the condensing lens 641, and via mirror 642 obliquely illuminating the developed image on xerographic plate 62 within cassette 68. The specularly reflected light then passes via objective lens 643 and mirrors 644 and 645 to the viewing screen 646. Because the clear toner used in developing the latent image scatters light incident upon it, specular reflection reaches the screen only from the non-imaged areas. Accordingly, an image appears at the screen 646 wherein imaged areas—such as would correspond to writing, graphics or the like—appear black, and background non-imaged areas appear white. This, it may be noted, is identical to the customary form in which such material is viewed on paper or the like, and is quite distinct from results achieved with other commonly utilized electronic display devices.

The display present upon the surface of the xerographic plate and at the viewing screen 646 may of course be retained indefinitely. However, under control of developing process unit 15 erasure may be simply accomplished merely by flooding the xerographic plate with light so as to render it totally conductive, and simultaneously oscillating the cassette in the same manner as has been described for development whereby the cascading developer 644 particles will frictionally effect full erasure of the imaged areas. Thereafter, the plate may be resensitized for initiation of a new cycle of write, display, etc. It may be noted in this connection that no attempt has been made in the present description to set forth complete details of the charging mechanism 69 utilized in the present system to sensitize the xerographic plate 62. These details have been omited as the charge sensitization techniques of xerography are considered to be so fully described elsewhere and otherwise well known, as to be apparent to those skilled in this art.

While the present invention has been particularly described in terms of a specific embodiment thereof, it will be understood that in view of the foregoing specification numerous deviations therefrom and modifications thereupon may be readily devised by those skilled in the art without yet departing from the present teaching. Accordingly, the present invention is to be broadly construed and limited only by the scope and spirit of the claims now appended hereto.

What is claimed is:

1. A data display system for two way communication with a remote telephone line-linked digital computer comprising:
   (a) cathode ray tube display means;
   (b) keyboard and encoding means adapted for producing encoded electrical character data in response to manual activation when said system is in a pre-look mode of operation;
   (c) decoder-storage means adapted for storing encoded character fonts transmitted from said computer when said system is in a load mode of operation, and for storing encoded character data generated by said keyboard and encoding means when said system is in a pre-look mode of operation, said means being further adapted to respond to encoded signals representative of said encoded characters and presented to said means when said system is in a write or pre-look mode, said means responding to said encoded signals by selectively gating out electrical signals indicative of the characters corresponding to said encoded signals;
   (d) character generator means electrically connected to said decoder-storage means and said cathode ray tube display means, said character generator means including circuitry for establishing a fixed scan pattern on the face of said cathode ray tube, said character generator means further including circuit means for intensity modulating said scan pattern in accord with said electrical signals from said decoder storage means whereby light patterns may be formed upon said cathode ray tube representative of said characters;

(e) vector plotting means electrically connected to the deflection circuitry of said cathode ray tube display means and adapted to receive digitally encoded data from said computer representative of the planar coordinates of a graphic representation, said vector-plotting means including circuitry for establishing and moving the light spot of said CRT display means in accordance with the said planar coordinates digitally transmitted from said central computer;

(f) data interface means electrically positioned to link said system to said telephone line, said data interface means including input router means and input/output register means for routing data to said computer or to portions of said system in accord with the mode of operation of said system;

(g) mode selection means for determining the mode of operation of said system;

(h) a xerographic display system including a xerographic plate, charge sensitization means for said plate, developing and erasure means, a viewing screen, and reflection optics means including a light source for projecting developed images on said xerographic plate to said viewing screen; and (i) optical means for imaging the light pattern on said cathode ray tube display means upon said xerographic plate when said plate is in a charge sensitized condition, whereby a latent electrostatic image may be formed upon said plate for subsequent development and display.

2. Apparatus according to claim 1 wherein said decoder storage means comprises a serially organized delay line, load logic means, and write logic means, said load logic means being electrically positioned and adapted to serially load successive digitally organized segments into said delay line from said computer when said system is in a load mode of operation, individual bits in each of said segments being thereby positioned at assigned points in the said segment corresponding to a given character in the said font, correspondingly positioned bits in successive segments having binary state values in accord with those necessary to blank or unblank said fixed scan pattern on the face of said cathode ray tube when said values are made to intensity modulate said pattern in synchronization with said scan, said delay line being adapted to cyclically recirculate said segments, said write logic being electrically positioned and adapted to gate out from said delay line a series of binary state valued signals identical to those stored in said delay line at said identical assigned points in said successive segments upon receipt of the said encoded signal representative of the character to which the assigned points correspond.

3. Apparatus according to claim 2 in which said vector plotting means comprises:
up-down counter means adapted to digitally store said coordinate values,
first digital to analog converter means for converting said stored digital coordinator values to analog voltages,
coupling means to couple said analog voltages to the deflection circuitry of said cathode ray tube display means whereby said light spot on the face of said cathode ray tube may be positioned in accordance with the values of said coordinates,
register means to store digital signals from said computer indicative of incremental changes in said coordinates,
second digital to analog converter means having reference voltage inputs, digital inputs and analog outputs, said digital inputs being electically connected to said register means, said converter means being adapted for converting said digital signals presented at said digital inputs to corresponding analog voltage signals at said outputs indicative of said incremental changes in said coordinates,
third digital to analog converter means having reference voltage inputs and digital inputs, said reference voltage inputs being electrically connected to the outputs of said second digital to analog converter means, said digital inputs being connected in parallel with a digital counter means adapted to increase the analog voltages present at the outputs of said means in discrete equal incremental steps corresscounding to the discrete successive integral states of the counter to the full value corresponding to the reference voltages at the said reference voltage inputs of said third converter means, the outputs of said third converter means being connected to said coupling means,
and logic means for adding the contents of said register means to said up-down counter means upon the output voltages of said third converter means reaching the said full value of voltages at the said reference voltage inputs of said means, said logic means further being adapted to simultaneously return said digital counter means to a zero condition, whereby the light spot on said CRT display means moves from a position corresponding to coordinate values present at a first time in the said up-down counter means to a position at a later time corresponding to the original coordinate positions plus the variation introduced by said incremental changes in coordinates, in discrete equal position changes of number corresponding to the total discrete states possible in said digital counter means.

4. Apparatus according to claim 2 wherein said xerographic display system is controlled by said computer through signals routed to said display system by said input router.

5. Apparatus according to claim 2 wherein said load logic means is further electrically positioned and adapted to serially load said encoded electrical character data from said keyboard and encoding means into a pre-look portion of said delay line reserved for such purposes when said system is in a pre-look mode of operation, and in which said write logic further is adapted to detect said encoded electrical character data and in response thereto gate out from said delay line the said series of binary state valued signals representative of the character to which said data corresponds.

6. Apparatus according to claim 5 in which said write logic is further adapted to gate out said encoded electrical character data from said pre-look portion of said delay line to said input/output registers and thence to said data interface means and said computer in response to manual activation by an operator.

7. A data display system responsive to a digital computer comprising:

(a) cathode ray tube display means;

(b) cyclic memory storage means adapted for storing digitalized character fonts transmitted to said system from said computer;

(c) decoder means responsive to encoded electrical character signals subsequently transmitted from said computer, said means being electrically positioned and adapted to gate out from said cyclic memory storage means the digitalized signals in said font indicative of said character;

(d) character generating means electrically connected to said decoder means and said cathode ray tube display means, said means being adapted to generate said character on the face of said cathode ray tube in response to said digitalized signals;

(e) vector plotting means electrically connected to the deflection circuitry of said cathode ray tube and adapted to receive digitalized encoded coordinate data from said computer and move said cathode ray tube light spot in accord with said data; and (f) display means adapted to integrate the light emanating from said cathode ray tube thereby forming a display pattern in accord with the real-time movement of said spot.

8. Apparatus according to claim 7 wherein said memory storage means comprises a circulating delay line, and said character generating means produces said character on said cathode ray tube by intensity modulating a fixed scan pattern in accord with the digital values of the said signals.

9. Apparatus according to claim 8 wherein said display means comprises a charge-sensitized xerographic plate, development means for the latent image formed on said plate, reflection optics projection system for light projecting said developed image, and erasure means for said developed image.

10. Apparatus according to claim 9 wherein said display means is actuated by digitalized electrical signals transmitted from said computer.

References Cited
UNITED STATES PATENTS

| | | | |
|---|---|---|---|
| 3,037,192 | 5/1962 | Everett | 340—172.5 |
| 3,241,120 | 3/1966 | Amdahl | 340—172.5 |
| 3,307,156 | 2/1967 | Durr | 340—172.5 |
| 3,323,119 | 5/1967 | Barcomb et al. | 340—172.5 X |
| 3,325,786 | 6/1967 | Shashoua et al. | 340—172.5 |

PAUL J. HENON, *Primary Examiner.*